US012059920B2

(12) United States Patent
Logan

(10) Patent No.: US 12,059,920 B2
(45) Date of Patent: Aug. 13, 2024

(54) PAINT BUCKET AND ROLLER STORAGE COMBINATION AND METHODS OF USE THEREOF

(71) Applicant: Gordon K Logan, Dillon, CO (US)

(72) Inventor: Gordon K Logan, Dillon, CO (US)

( * ) Notice: Subject to any disclaimer, the term of this patent is extended or adjusted under 35 U.S.C. 154(b) by 492 days.

(21) Appl. No.: 17/464,812

(22) Filed: Sep. 2, 2021

(65) Prior Publication Data

US 2022/0203756 A1 Jun. 30, 2022

Related U.S. Application Data

(60) Provisional application No. 63/156,460, filed on Mar. 4, 2021, provisional application No. 63/131,015, filed on Dec. 28, 2020.

(51) Int. Cl.
*B44D 3/12* (2006.01)

(52) U.S. Cl.
CPC .............. *B44D 3/128* (2013.01); *B44D 3/123* (2013.01)

(58) Field of Classification Search
CPC .......... B44D 3/12; B44D 3/123; B44D 3/126; B44D 3/128
USPC .......................................... 15/230.11, 257.06
See application file for complete search history.

(56) References Cited

U.S. PATENT DOCUMENTS 5,727,708 A * 3/1998 Erickson .................. B44D 3/12 220/570
2004/0154119 A1* 8/2004 Bullock ............... A46B 5/0083 492/19
2004/0238399 A1* 12/2004 Billado, Jr. ......... B05C 17/0245 206/349
2006/0226156 A1* 10/2006 Lundy .................... B44D 3/123 220/570
2010/0287723 A1* 11/2010 Prokop .................. B44D 3/126 15/257.06

OTHER PUBLICATIONS

Wooster, 2-gallon metal grid, Apr. 9, 2010 (Year: 2010).*

* cited by examiner

*Primary Examiner* — Eric J Rosen
*Assistant Examiner* — Sharonda T Felton
(74) *Attorney, Agent, or Firm* — Leyendecker & Lemire

(57) ABSTRACT

A combination of a paint bucket of traditional size with a paint bucket grid and paint roller with a roller cover attached is described wherein the grid and the paint roller can be stored in the bucket without the handle extending above the brim of the bucket and the roller cover not touching a shallow pool of liquid paint in the bottom of a cavity of the bucket.

3 Claims, 9 Drawing Sheets

PAINT BUCKET AND ROLLER STORAGE COMBINATION AND METHODS OF USE THEREOF

RELATED APPLICATIONS

This application claims priority and incorporates by reference U.S. Provisional Application 63/131,015 filed on Dec. 28, 2020, and U.S. Provisional Application 63/156,460 filed on or about Mar. 2, 2021. Both Provisional Applications have the same inventor as the present application.

BACKGROUND

Professional painters often paint with paint rollers directly from a five gallon bucket, which is more convenient than painting out using a paint tray with limited paint capacity that has to be refilled on a relatively frequent basis. To replace the ribbed portion of a tray over which a paint roller cover that has been immersed in a pool of paint is rolled to both load the interior of the roller cover's nap with paint and squeegee excess paint from the roller cover, a paint bucket grid is utilized to serve the same purpose.

The paint bucket grid typically comprises a metal screen contained within a frame that includes hooks that are attached to the lip of a five gallon bucket in use. A painter typically dunks his/her roller cover attached to a paint roller frame into the pool of paint contained in the bucket and then rolls the cover across the screen, which is located above the paint. The excess paint squeezed from the roller cover drains along the screen and back into the paint pool.

At the end of a day of painting on a multi-day job or when taking an extended break, such as for lunch, painters prefer to keep the roller covers they have been using moist and fresh so they do not need to replaced or cleaned as often. To do this, the hooks 25 of the paint bucket grid 20 is unhooked from the rim of the bucket 10 and lowered into the bucket. The bucket typically has some wet paint in it. As shown in prior art FIG. 1, the top of the handle of the roller frame 15 is placed on the top edge of the paint bucket grid typically suspending the wet roller cover over the pool of paint in the bucket's bottom. As shown, a substantial portion of the handle extends above the top edge of the bucket. To seal the bucket and create a moist atmosphere therein, a piece of plastic sheeting of the type typically used as a disposable drop cloth is draped over the protruding handle and the top of the bucket. The sheeting is then taped in place using painters encircling the bucket and creating the sealed atmosphere. As can be appreciated, the roller remains moist and can be immediately used when painting is resumed thereafter.

This method, while very useful, suffers from several drawbacks. Most notably, because the handle of the roller frame extends above the brim of the bucket, multiple buckets cannot be compactly stored in a space by stacking one on top of another. Additionally, this method wastes both painters tape and plastic sheeting offsetting the economic benefits obtained by not throwing our the roller cover or not having spend valuable time cleaning the cover.

DETAILED DESCRIPTION

Figure 1:
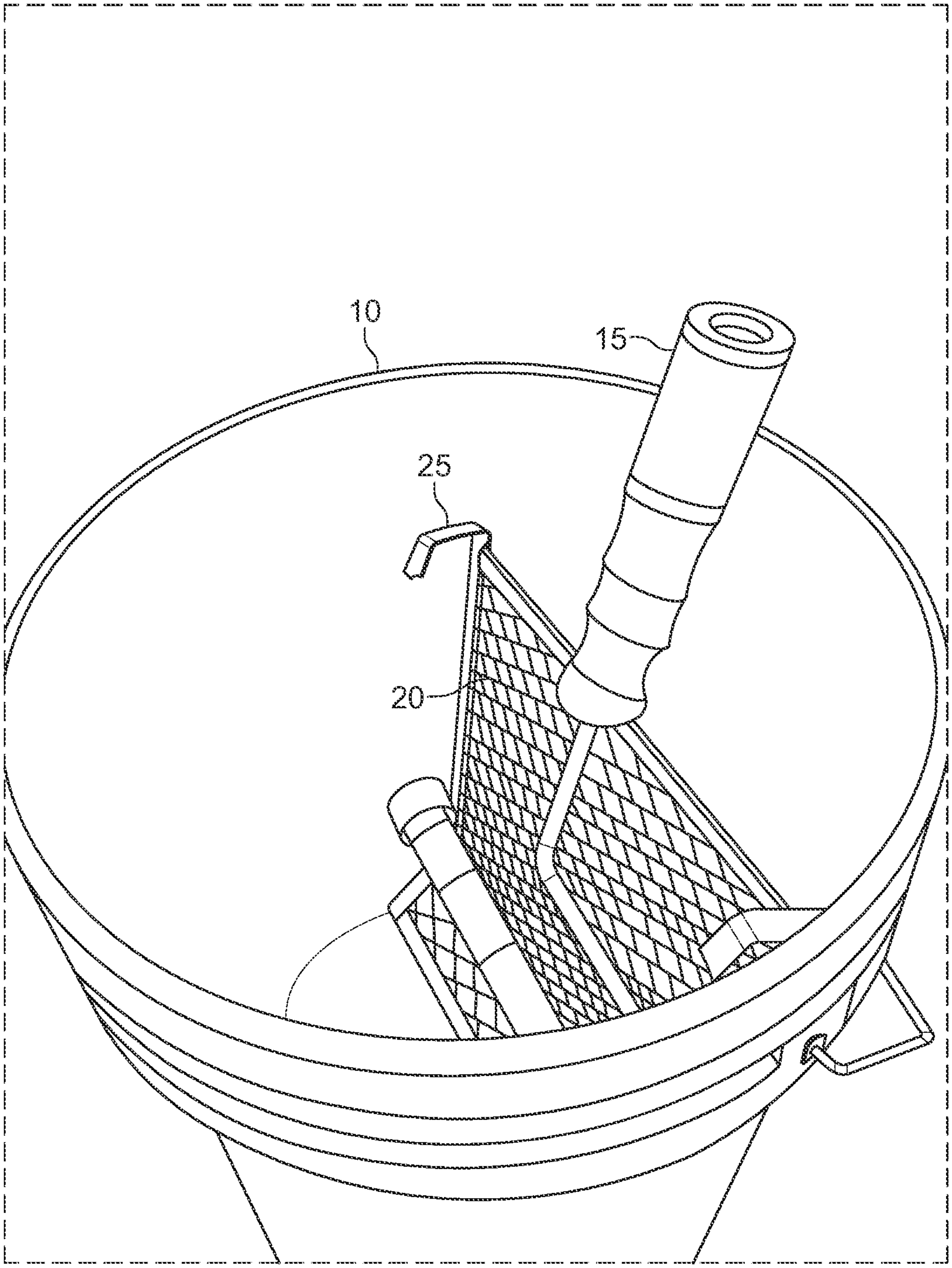
FIG. 1 (Prior Art)
FIG. 1 is a prior art perspective view of a wet roller currently stored in a bucket with the handle of the roller frame sticking out above the brim of the bucket sans the plastic sheeting and painter's tape.

Embodiments of the invention comprise in combination a paint bucket, a paint bucket grid, and a paint roller (also referred to as a "roller frame"). A further element of the combination can include the paint bucket cover.

The paint bucket typically comprises a five gallon bucket although embodiments and variations of the present invention are not limited to a particular size container. The bucket is a standard size in which five gallons of paint is contained. The buckets are usually comprised of plastic and include a reusable cover.

The paint bucket grid is has similarities to prior art grids in that it comprises a screen surrounded by a frame with a pair of hooks that permit the grid to be hung from the brim or top edge of the bucket. The grid is smaller in height than prior art grids, such that the top edge of the grid is much lower in the bucket than a prior art grid when placed in an overnight configuration.

The roller frame is similar to prior art roller frames except is has a shorter overall length comparted to prior art roller frames. Particularly, the shaft of the roller frame is bent perpendicular to the axis of the handle just above a top edge of the handle in contrast to a prior art roller frame wherein the shaft extends vertically for several inches before being bent perpendicularly relative to the axis of the handle.

The combination of a shorter grid coupled with the shorter shaft of the roller frame permit the paint roller to be hung from the top of the grid in much the same manner as the prior art combination, but in such a manner that the bottom side of the roller frame handle is located below the brim of the bucket. Accordingly, the bucket's top can be used to seal bucket not requiring the use of plastic sheeting or tape. Further, several buckets can be stacked on top of each other allowing for more efficient overnight storage.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

Figure 4:
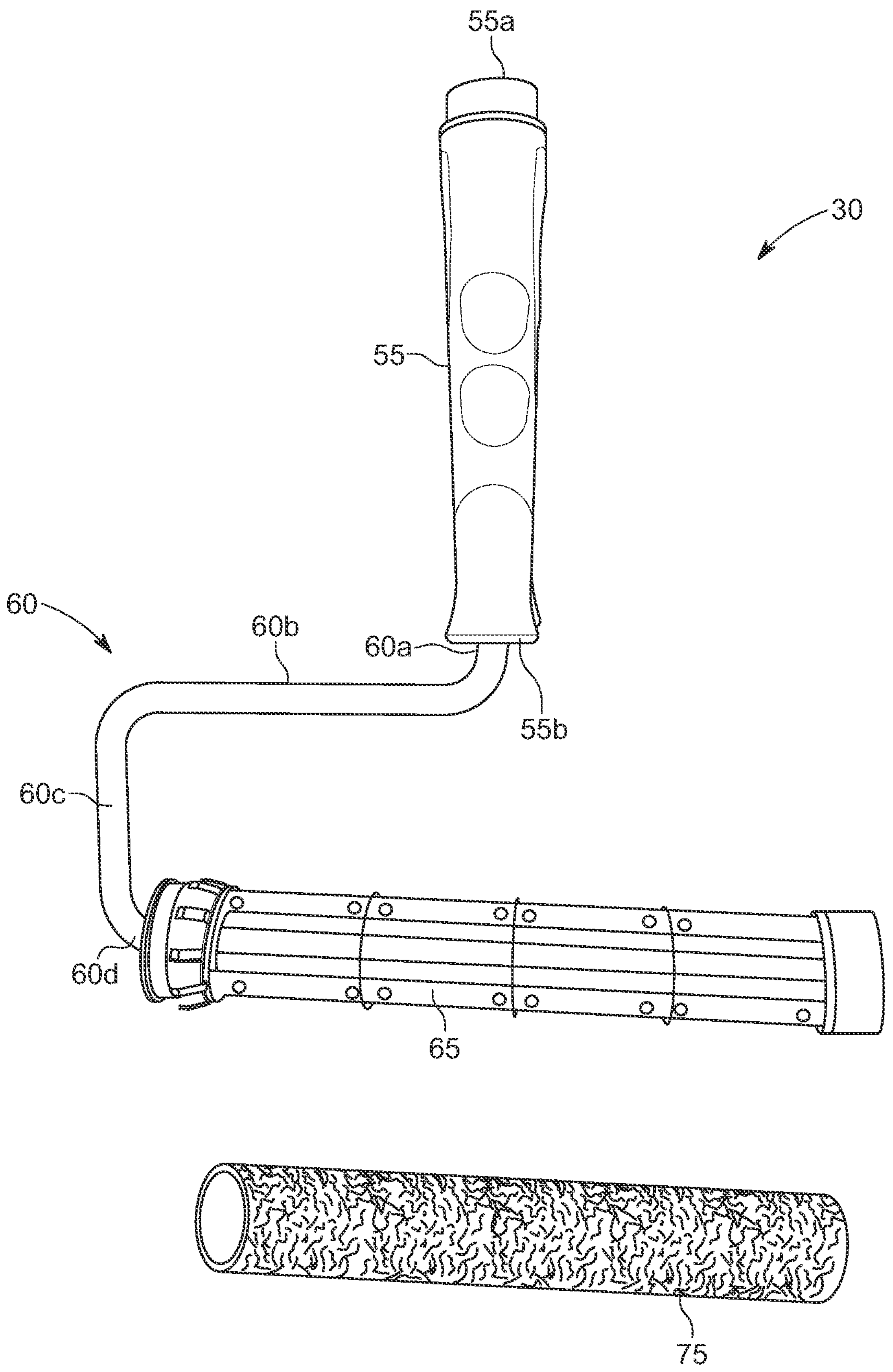
FIG. 4 is a perspective view of a paint roller frame according to one embodiment of the present invention.
Figure 5:
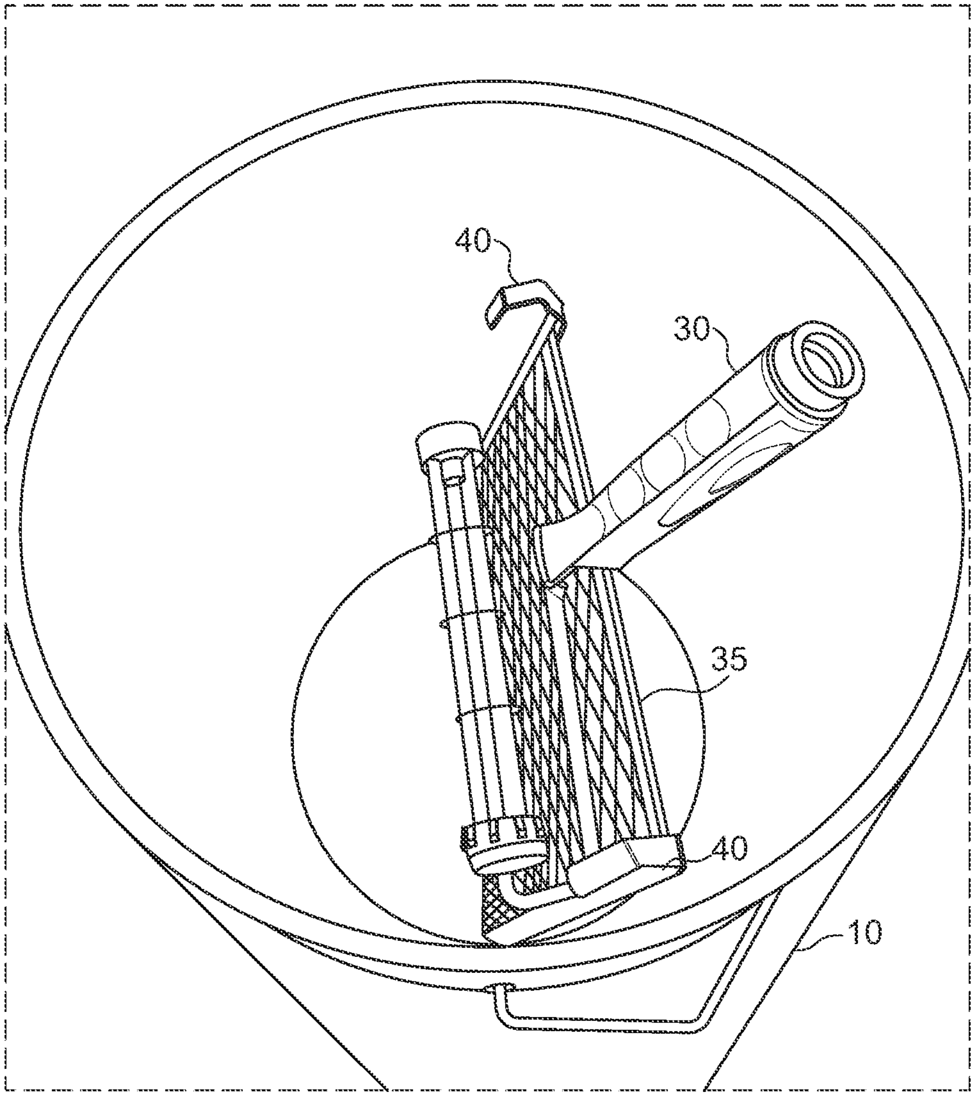
FIG. 5 is a perspective view of a wet roller is stored in a bucket with handle of the roller frame not protruding above the brim of the bucket accordingly to an embodiment of the present invention.
Figure 6:
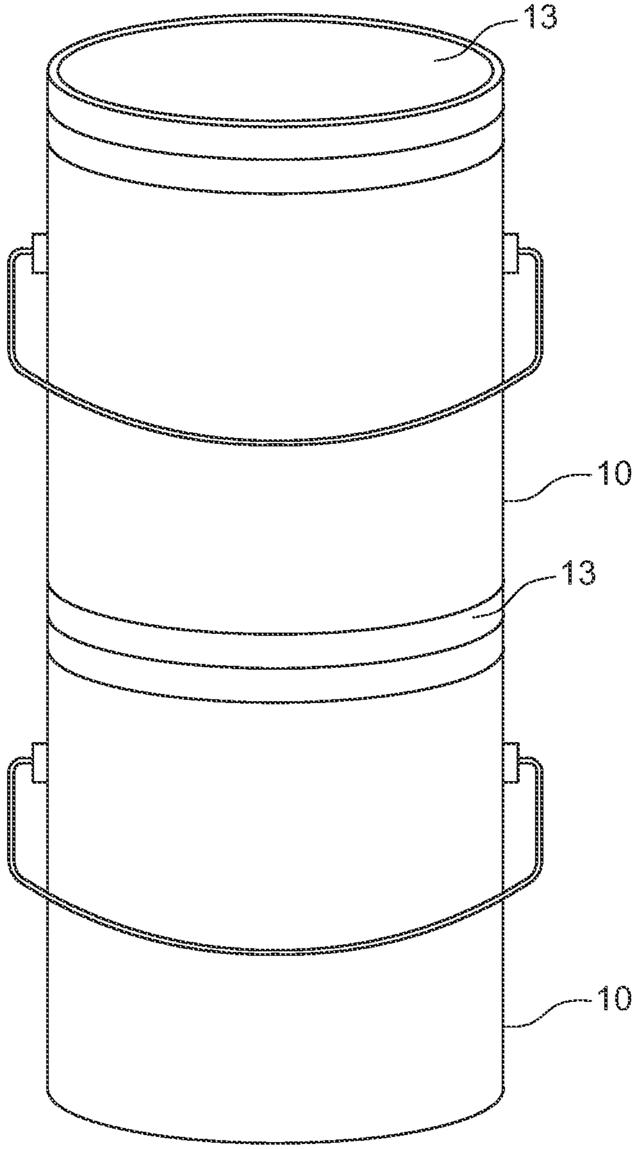
FIG. 6 is an illustration of two paint buckets containing a paint roller and paint bucket grid therein stacked one on the other according to an embodiment of the present invention.
Figure 7:
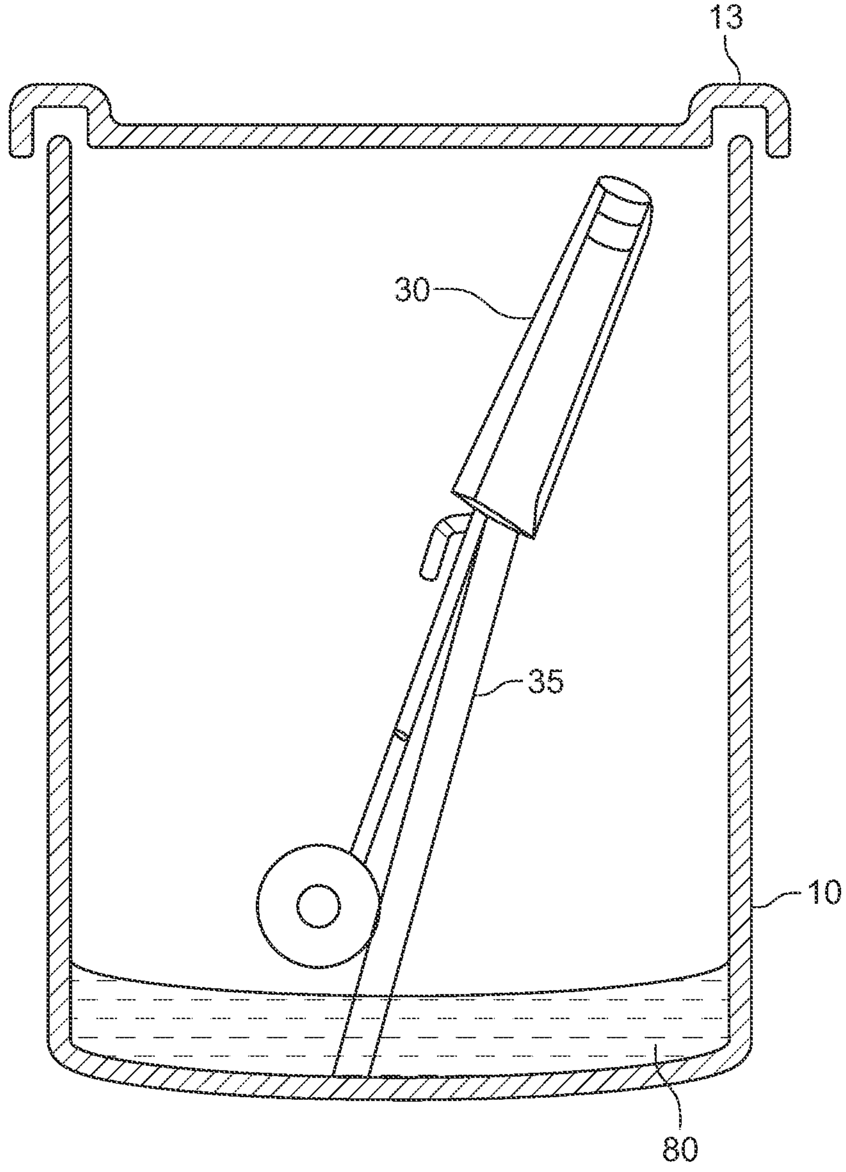
FIG. 7 is a cutaway of a sealed bucket containing a paint roller, a paint bucket grid and some liquid paint according to an embodiment of the present invention.

An Embodiment of a Combination of a Paint Bucket, a Paint Roller and a Paint Bucket Grid FIGS. 5 & 7 are illustrations of a combination of a paint bucket 10, a paint bucket grid 35 and a paint roller 30 with the paint roller and paint bucket grid wholly received in a sealed paint bucket. Advantageously, this configuration permits a painter to seal the bucket with a standard bucket lid 13 by snapping it in place, such that with some liquid paint contained in the bottom of the bucket, a paint roller cover 75 (see FIG. 4) attached to the paint roller can remain moist and ready for use after a period of storage. Additionally, paint buckets can be stacked as shown in FIG. 6 allowing for more space-efficient storage when compared to prior art combinations and methodology.

Figure 2:
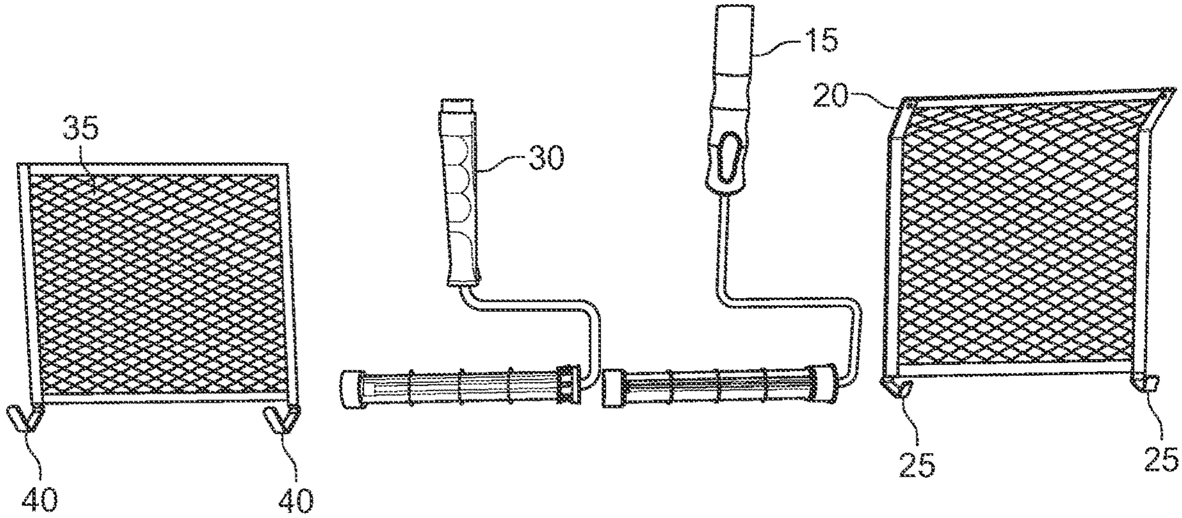
FIG. 2 is a illustration of a typical prior art paint bucket grid and roller frame compared to a paint bucket grid and roller frame of an embodiment of the present invention.

FIG. 2 is a side by side illustration of the improved paint roller 30 and paint bucket grid 35 that facilitates the novel combination. As can be seen, the improved paint bucket grid 35 is about the same width as the prior art grid 20 with similar hooks, 25, 40 used to secure the grids to a rim of a five gallon bucket; however, the improved grid is significantly shorter than the prior art grid.

The improved paint roller 30 is also of similar width as the prior art roller 15. It has a similarly sized handle and receives the same sized roller cover thereon. The improved roller is shorter than the prior art roller, and more specifically, the length of the shaped shaft 60 (see FIG. 4) is significantly shorter than the similar shaft of the prior art roller. When the grid and the roller are stacked within a paint bucket in a similar manner as done in the prior art with prior art rollers and grid, the top of the handle 55 is located below the brim of the bucket allowing a cover 13 to be placed thereon.

The five gallon bucket 10 as shown in FIGS. 1 & 5-7 is of relatively standard dimensions and is usually made from plastic. It typically has a bottom diameter of 10.3", a top diameter proximate the brim of 11.9", and a height of 14.5". The slight taper of the diameter from top to allows empty buckets to be stacked and nest one on top of another for storage and transport. The smaller diameter of the base or bottom relative to the top also facilitates the stacking of the buckets on top of each other when a lid 13 is fitted and snapped in place on the bucket. It is to be appreciated other size buckets can be utilized as well with an appropriately sized paint grid and paint roller.

Figure 3:
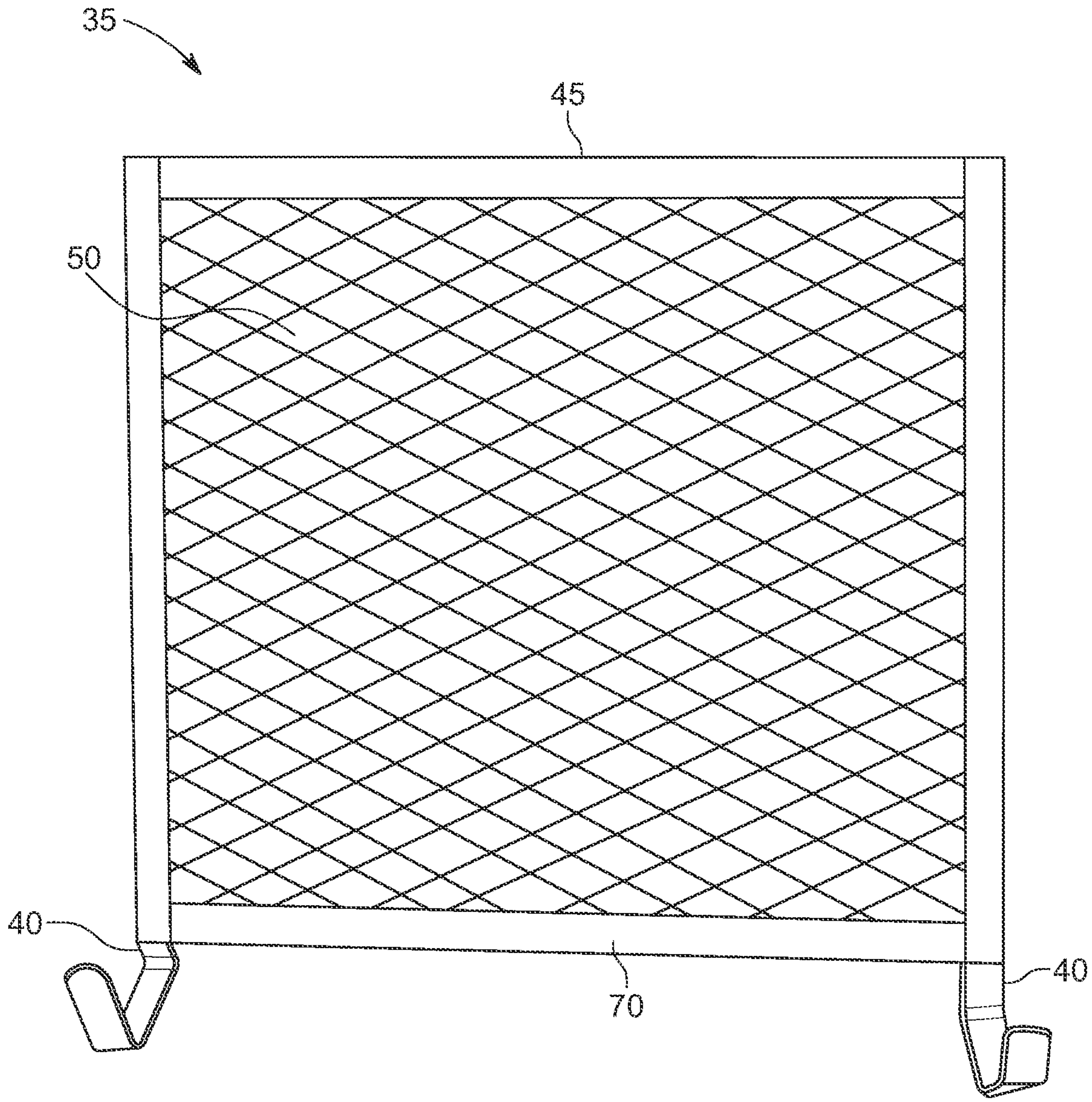
FIG. 3 is a perspective view of a paint bucket grid according to one embodiment of the present invention.

FIG. 3 is an illustration of the improved paint bucket grid 35. It is typically comprised of an expanded metal screen 50 that is surrounded by a metal frame. The top end 70 includes a pair of hooks 40 at it respective ends that are configured to hook over a brim of a paint bucket. Depending on the amount of paint in a particular bucket the bottom edge 45 of the grid may be submerged in liquid paint contained in the bucket. The width of the grid is critical to its intended use as a surface over which a paint roller cover saturated in paint can be rolled to squeegee off any excess. The excess paint once liberated from the cover drains along the screen downwardly back into the pool at the bottom of the bucket.

A typical grid for use in a typical five gallon bucket is about 10 inches in width. Accordingly, when hooked over the bucket brim it is located partially to the side of the bucket rather than extending across the bucket's center providing ample room for a painter to dip the roller in the pool of paint and roll it against the screen without it binding against the sides of the cylindrical bucket.

As mentioned above, the length of the grid 35 is shorter than that of a prior art paint bucket grid typically measuring about 8.5 inches in length. This length in combination with the overall length of the paint roller's handle 55 (See FIG. 4) facilitate the storage of the combination in the bucket while also permitting the buckets cover to be used to seal the bucket's interior cavity.

FIG. 4 is an illustration of the improved paint roller 30. It comprises an elongated handle 55 with a bottom end **55*a* and a top end 55*b***. The length of the handle can vary but is typically similar to the length of handles of prior art paint rollers give or take an inch or so.

Extending from the top end **55*b* of the handle 55 is a shaped shaft 60** comprises several orthogonal bends. The shaft is typically comprised of metal rod that has been bent into the desired configuration. Metals such as steel and aluminum can be used.

The shaped shaft 60 comprises a first portion **60*a* that extends into the handle 55, which is secured to it. Only the top of the first portion is visible in FIG. 4 as the shaft is orthogonally bent just above its exit from the top end 55*b* of the handle. With reference to FIG. 2, this is in contrast to the prior art roller 15** wherein its corresponding first portion extends outwardly of the corresponding top end of the handle for several inches. It is the difference in length of the first portion above the handle that essentially accounts for the difference in length of the illustrated embodiment and the prior art roller.

The second portion 60*b* extends orthogonally to both the first portion 60*a* and the longitudinal axis of the handle 55. It terminates at a second orthogonal bend transitioning into a third portion 60*c*. The third portion extends upwardly and is generally parallel to the first portion. The length of the third portion is relatively short to provide clearance to the roller body 65 with a roller cover 75 attached thereto. The third portion terminates at a third orthogonal bend transitioning into the final fourth portion 60*d*. Only a small portion of the fourth portion can be seen in FIG. 4 proximate the third orthogonal bend as most of it is covered by the roller body 65.

As indicated, extending from and over the fourth portion 60*d* of the shaped shaft 60 is the roller body 65. The roller body is rotatably coupled with the fourth portion and is configured to snuggly receive a paint roller cover 75 thereover.

In normal use by a painter, the bucket 10 is filled partially with liquid paint. The paint bucket grid 35 is secured to the side of the bucket by placing the hooks 40 over the brim thereof. Depending on the paint level, the bottom end 45 of the grid may be submerged in the paint. A paint roller 30 with a paint roller cover 75 received over the roller frame 65 is dunked into the paint. After pulling it out of the paint, the paint roller cover is rolled along the grid's screen 50 to wring out excess paint, as well as, evenly distribute the paint on the cover. The roller is then used in the traditional manner to paint a desired surface. The process is repeated regularly as painting continues until such time as the day's work is concluded or another break in painting is required.

As can be appreciated, if a painting job cannot be finished within a day, the painter(s) will return the next day and continue painting. Larger jobs can require several days if not more to complete. If the paint roller 30 with a cover 75 thereon is not cleaned and is left out, the paint residue thereon will dry and make the cover unusable. Further, cleaning a cover sufficiently so that there is no paint residue is time consuming and generally not worth the associated expense in manpower.

Throwing away a paint roller cover after every extended break can also be costly. Accordingly, it is known to store a wet roller in a sealed humid environment with liquid paint as discussed above in relation to FIG. 1. As mentioned, this previously required the use of plastic sheeting and tape to seal the roller and cover within a bucket with a pool of liquid paint at its bottom. These sealed prior art configurations cannot be stacked potentially requiring a significant amount of floor space to store multiple buckets between use.

With embodiments of the present combination as shown in FIGS. 6 & 7, the roller 30 with the cover 75 can be stored in a moist environment using a standard paint bucket lid 13 to snap in place and seal the paint bucket. First the painter ensures there is a sufficient pool of liquid paint 80 in the bottom of the bucket 10. Normally, at the end of a shift or day, there will still be at least a little paint in the bucket's bottom. Next, the grid 35 is unhooked from the bucket's brim and lowered into the bucket's internal cavity until it bottom end 45 rests against the bottom of the bucket and its sides against the side of the bucket.

The roller 30 with its roller cover 75 attached is lowered into the bucket until the lip of the handle's top end 55*b* rests against the top end 45 of the paint bucket grid 35. There may be a groove or slot in the top end to better affix it to the top of the grid, although the canted angle of the grid with the roller resting on the upwardly facing side helps hold the roller in place. As illustrated, the roller cover is typically positioned slightly above the pool of paint 80 not resting in it. Most importantly, the bottom end 55*a* of the handle is positioned below the brim of the bucket such that the lid 13 can be snapped in place on the brim to seal the internal cavity of the bucket.

Unlike prior art combinations and methods of storing a roller including an in-use roller cover, the combination illustrated in FIGS. 5 & 7 can be stacked as shown in FIG. 6 allowing for a more organized and space efficient configuration of a plurality of paint bucket/grid and roller combinations between use. Buckets 10 can be stacked two or more high and as such take up only the fraction of the floor space.

Figure 8:
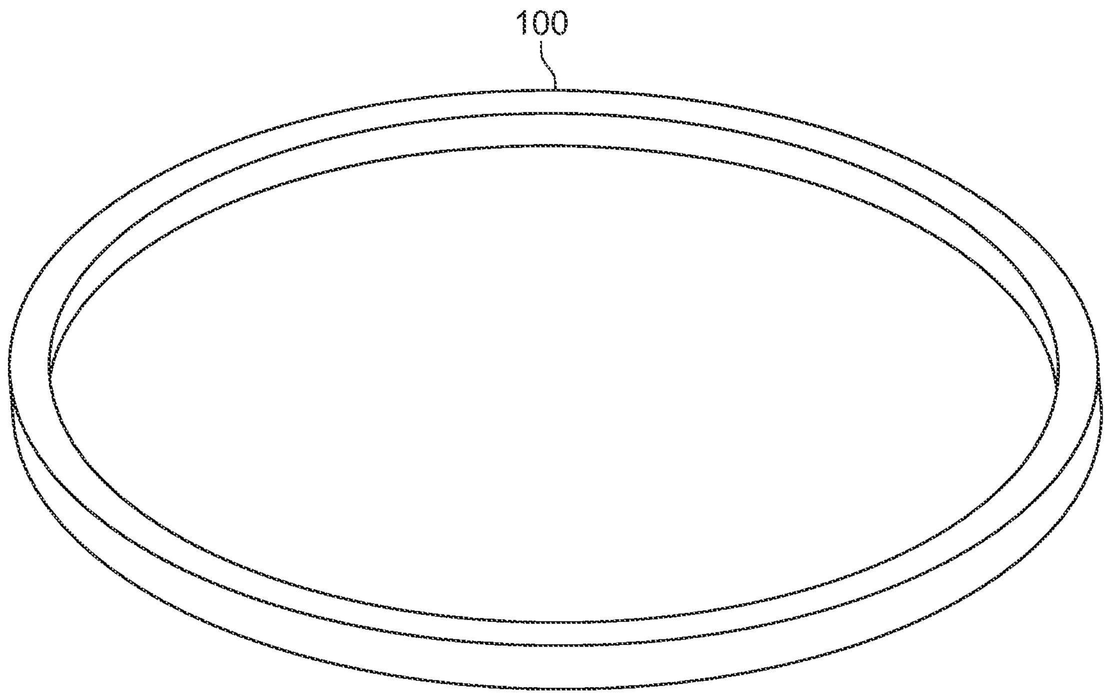
FIG. 8 is a perspective top view of a paint bucket ring according to an embodiment of the present invention.

An Embodiment of a Lid Ring for Use with a Paint Bucket to Store Standard Length Paint Bucket Grid and Paint Roller FIG. 8 is an illustration of a plastic ring 100 having a generally downwardly open C-shaped cross section. It is configured to snap over the brim of a paint bucket 10 having a top opening of a similar diameter. The ring is generally similar to the perimeter of a bucket lid 13, which also snaps onto a bucket with a similarly sized opening. The primary purpose is to replace tape as a means for securing plastic wrap over an associated bucket to seal a prior art paint roller and grid therein.

Figure 9:
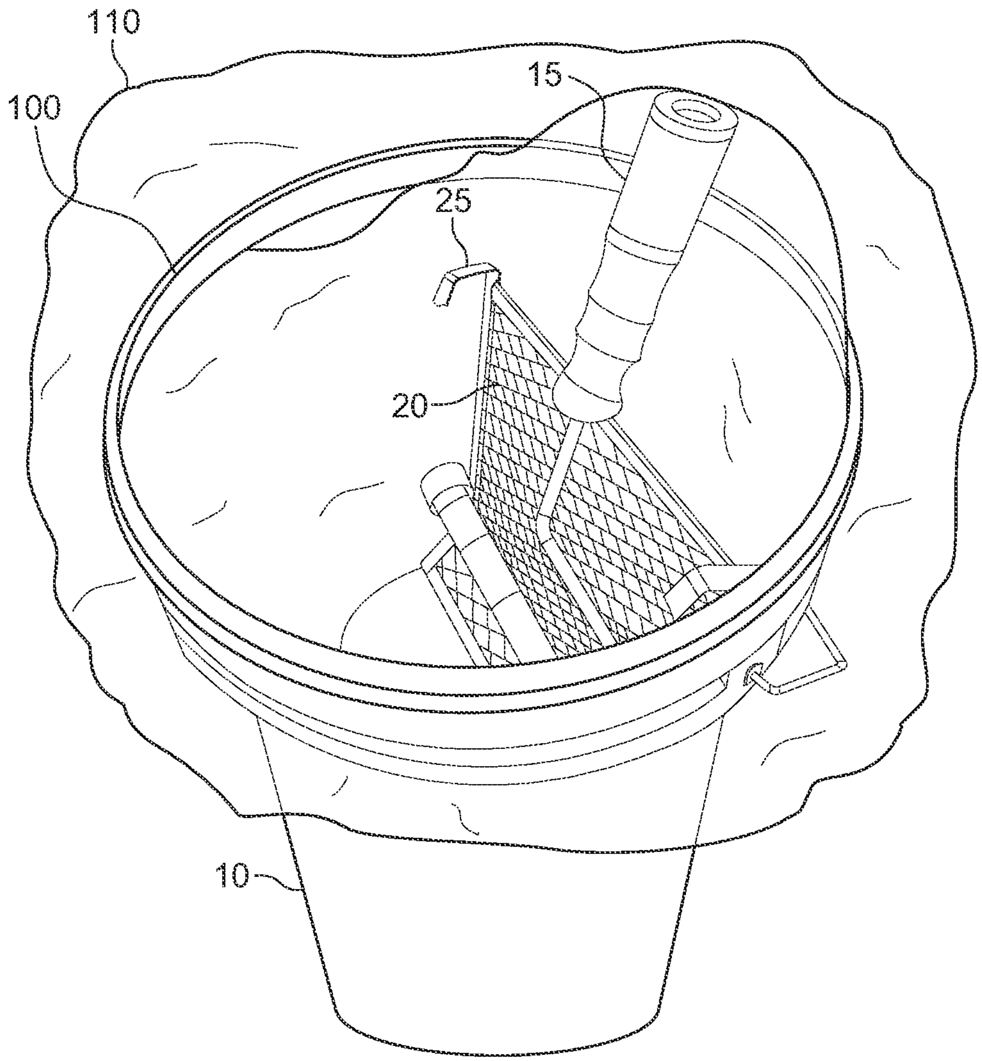
FIG. 9 is a perspective view of a combination comprising a paint bucket, a prior art paint bucket grid and a prior art roller frame received in the bucket, a piece of plastic sheet draped over the top of the bucket, and a paint bucket ring sealing the plastic sheet to the brim of the bucket according to an embodiment of the present invention.

FIG. 9 illustrates a combination of a bucket 10, a paint roller 15 and a paint bucket grid 20 received in the bucket in a similar manner as shown in FIG. 1 with a piece of thin plastic sheeting 110 draped over the opening and the lid ring 100 pressed over the plastic sheeting extending over the brim and snapped onto the brim sealing the interior of the bucket.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of storing paint and maintaining the usability of a paint roller cover after an extended period of storage, the method comprising:

providing in combination a first paint bucket, a paint roller, and a paint bucket grid wherein (i) the first paint bucket has a bottom side, at least one sidewall intersecting with and rising upwardly terminating at a brim to form an internal cavity, the internal cavity having a cavity width, cavity height, and a cavity bottom, (ii) the paint roller having an overall roller length, a roller width, a handle with a handle axis, a handle length, a handle bottom end, and a handle top end, a shaped shaft extending from the handle, and a roller body rotatably attached to the shaped shaft and having a roller axis substantially orthogonal to the handle axis, and (iii) the paint bucket grid comprises a generally rectangular screen having a screen width, a grid height, a grid width, a grid top edge, a grid bottom edge, and at least a pair of hooks extending upwardly proximate the grid top edge, the pair of hooks configured to hook over the rim of the first paint bucket, wherein the grid height plus the handle length is less than the cavity height, and the roller width being less than the cavity width;

unhooking the paint bucket grid from the brim and lowering the paint bucket grid into a pool of liquid paint with the grid bottom edge resting on the cavity bottom;

lowering the paint roller into the cavity and resting the handle top end on the grid top edge suspending the roller cover above the pool of liquid paint with the handle bottom end being located below the brim; and covering the internal cavity at the brim.

2. The method of claim 1, wherein said covering the internal cavity comprises placing and sealing a paint bucket lid over the brim.

3. The method of claim 2, further comprising:

providing a second paint bucket, the second paint bucket being substantially the same size as the first paint bucket, the second paint bucket further having a second paint bucket lid secured to a second brim of the second paint bucket; and stacking the first paint bucket sealed with the first paint bucket lid and the paint roller and paint bucket grid therein on top of the second paint bucket lid.

* * * * *